US008631578B2

(12) United States Patent
Glasspoole et al.

(10) Patent No.: US 8,631,578 B2
(45) Date of Patent: Jan. 21, 2014

(54) RADIAL BALANCING CLIP WEIGHT FOR ROTOR ASSEMBLY

(75) Inventors: David F. Glasspoole, St. Lambert (CA); Francois Caron, Longueuil (CA)

(73) Assignee: Pratt & Whitney Canada Corp., Longueuil (CA)

(*) Notice: Subject to any disclaimer, the term of this patent is extended or adjusted under 35 U.S.C. 154(b) by 1027 days.

(21) Appl. No.: 12/571,495

(22) Filed: Oct. 1, 2009

(65) Prior Publication Data

US 2011/0078901 A1 Apr. 7, 2011

(51) Int. Cl.
*B21D 53/78* (2006.01)
*B21K 3/04* (2006.01)
*B23P 15/02* (2006.01)

(52) U.S. Cl.
USPC ........ 29/889.7; 29/889; 29/889.2; 29/889.21; 416/119; 416/144; 416/145; 416/500

(58) Field of Classification Search
USPC ............. 29/889–889.722; 416/144, 145, 119, 416/500
See application file for complete search history.

(56) References Cited

U.S. PATENT DOCUMENTS

| 2,366,795 | A | 1/1945 | Lamoreaux |
| 2,610,823 | A | 9/1952 | Knowlton, Jr. |
| 3,687,244 | A | 8/1972 | Hillegass et al. |
| 4,220,055 | A | 9/1980 | Dubois et al. |
| 4,803,893 | A | 2/1989 | Bachinski |
| 4,842,485 | A | 6/1989 | Barber |
| 4,879,792 | A | 11/1989 | O'Connor |
| 4,926,710 | A | 5/1990 | Novotny |
| 5,011,374 | A | 4/1991 | Miller |
| 6,358,009 | B1 | 3/2002 | Link |
| 6,481,969 | B2 | 11/2002 | Berry et al. |
| 6,893,222 | B2 | 5/2005 | Allam |
| 7,377,749 | B2 | 5/2008 | Charrier et al. |
| 2006/0236796 | A1* | 10/2006 | Harada ............................ 74/52 |

* cited by examiner

*Primary Examiner* — Richard Chang

(74) *Attorney, Agent, or Firm* — Norton Rose Fulbright Canada LLP

(57) ABSTRACT

A balancing weight clip with a mass adapted to balance a rotor assembly of a gas turbine engine, includes a weight portion, a first flange engaging portion and a second flange engaging portion extending from the weight portion, each being engageable with a sidewall of at least one recess located on an edge of a flange of a disc of the rotor assembly. Each flange engaging portion is provided with a hook engageable with a mating groove provided on a face of the flange. At least one of the first and second flange engaging portions is resiliently biased so that the first and second flange engaging portions are elastically moveable away from one another to removably secure the balancing weight clip to the flange and engage each hook with the mating groove.

20 Claims, 7 Drawing Sheets

RADIAL BALANCING CLIP WEIGHT FOR ROTOR ASSEMBLY

TECHNICAL FIELD

The application relates generally to gas turbine engines, more particularly to balancing methods and devices for rotor assemblies in such gas turbine engines.

BACKGROUND

In gas turbine engines, balancing rotors is of importance for reducing vibrations. Usually, in order to balance a rotor, balancing weights are secured to the rotor at a particular circumferential position using additional securing devices, such as rivets for example. In addition to increasing the total weight of the assembly, the use of such additional securing devices increases the complexity of the assembly. As higher temperature, yet somewhat more brittle, materials are used for turbine disc assemblies, improvements must be made their design to improve their associated fatigue lives.

Accordingly, there is a need for improvement.

SUMMARY

There is provided a rotor assembly for a gas turbine engine, comprising: a disc adapted for mounting to an engine shaft defining a longitudinal axis, the disc having two opposed faces and a circumferential blade receiving edge therebetween adapted for mounting of a plurality of radially projecting blades; an axially extending flange projecting from one of the two opposed faces of the disc and circularly extending thereon, an edge of the flange having at least one recess, the flange having a circumferential groove discontinuously extending about a circumference thereof; and at least one balancing weight clip comprising a first flange engaging portion, a second flange engaging portion and a weight portion therebetween, the first and second flange engaging portions each being provided with a hook mating with the circumferential groove, the balancing weight clip being removably secured to the flange in a secured position wherein the hooks each engage the circumferential groove, the at least one balancing weight clip being immobile in an axial and circumferential direction when in the secured position, at least one of the first and second flange engaging portions being resiliently biased so that the first and second flange engaging portions are elastically moveable away from one another to receive the flange in a flange receiving opening defined by the first flange engaging portion, the second flange engaging portion and the weight portion.

There is also provided a balancing weight clip having a mass adapted to balance a rotor assembly of a gas turbine engine, comprising: a weight portion; and a first flange engaging portion and a second flange engaging portion extending from the weight portion, each being engageable with a sidewall of at least one recess located on an edge of a flange of a disc of the rotor assembly, and each being provided with a hook engageable with a mating groove provided on a face of the flange, at least one of the first and second flange engaging portions being elastically deformable so that the first and second flange engaging portions are elastically moveable away from one another to removably secure the balancing weight clip to the flange and engage each said hook with the mating groove.

In a further aspect, there is provided a method for balancing a rotor disc having two opposed faces and an axially extending flange projecting from one of the two opposed faces of the disc and circularly extending thereon, an edge of the flange having at least one recess, the flange having a groove discontinuously extending about a circumference thereof, the method comprising: abutting a balancing weight clip against the flange of the rotor disc, the balancing weight clip having a weight portion and a first flange engaging portion and a second flange engaging portion extending from the weight portion, each being engageable with a sidewall of at least one recess, and each being provided with a hook engageable with the groove of the flange, at least one of the first and second flange engaging portions being elastically deformable so that the first and second flange engaging portions are elastically moveable away from one another to removably secure the balancing weight clip to the flange and engage each hook with the mating groove, the balancing weight clip having a weight adapted to balance the rotor assembly, the abutting the balancing weight clip comprising abutting each hook against a sidewall of the at least one recess of the flange; and exerting a force on the weight portion towards the flange in order to engage the hooks with the groove and removably secure the balancing weight clip to the flange, the exerting the force resulting in elastically moving away the first and second flange engaging portions from one another.

DESCRIPTION OF THE DRAWINGS

Reference is now made to the accompanying figures, in which:

FIGS. 3b is a front view of the balancing weight clip of FIG. 3a;

DETAILED DESCRIPTION

Figure 1:
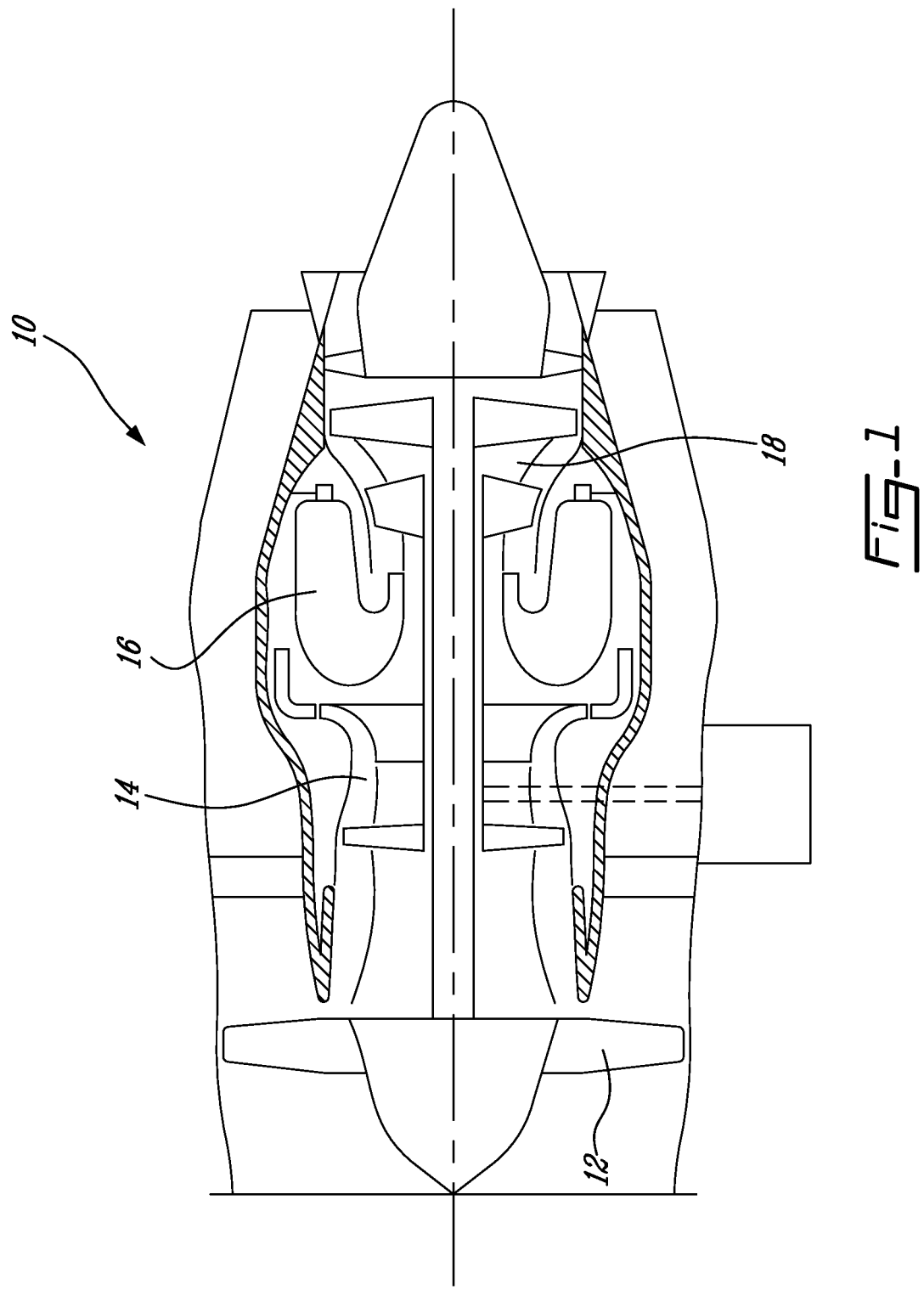
FIG. 1 is a schematic cross-sectional view of a gas turbine engine.

FIG. 1 illustrates a gas turbine engine 10 of a type preferably provided for use in subsonic flight, generally comprising in serial flow communication a fan 12 through which ambient air is propelled, a multistage compressor 14 for pressurizing the air, a combustor 16 in which the compressed air is mixed with fuel and ignited for generating an annular stream of hot combustion gases, and a turbine section 18 for extracting energy from the combustion gases.

Figure 2:
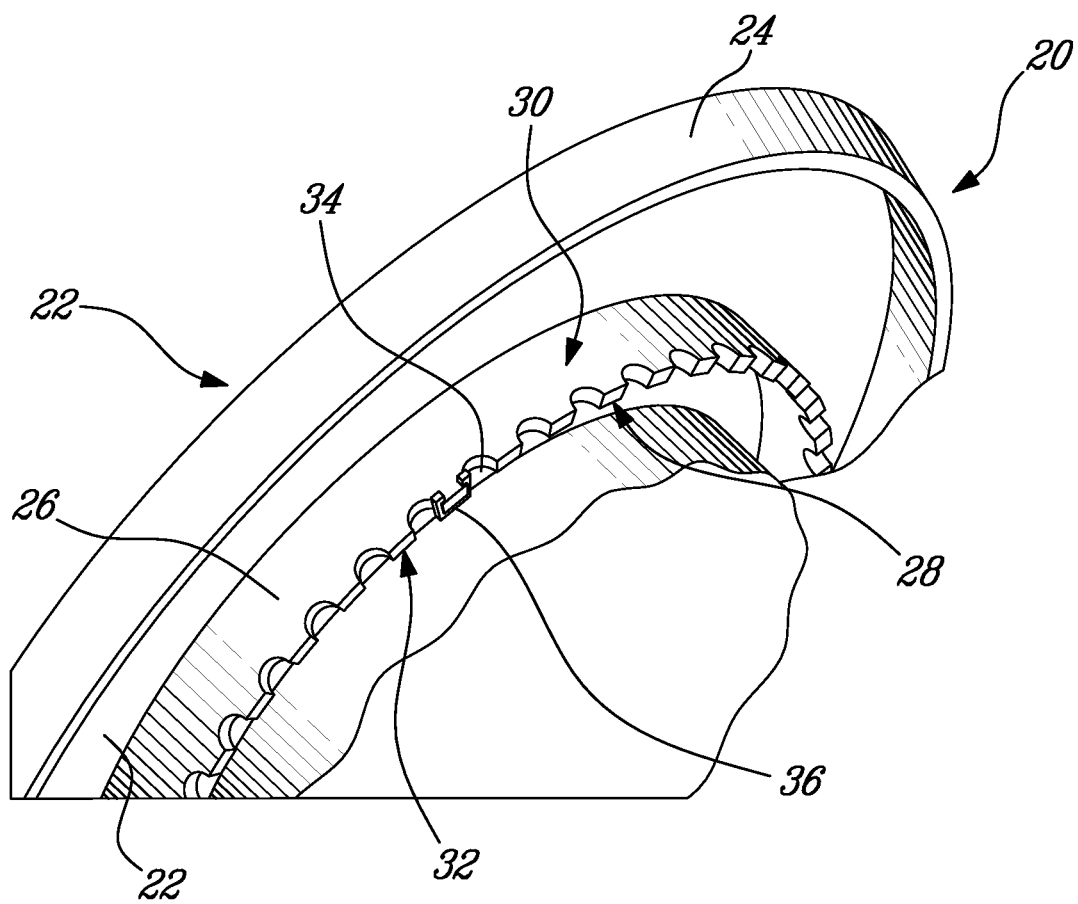
FIG. 2 is a partial perspective view of a rotor disk having a scalloped flange, in accordance with an embodiment.

FIG. 2 illustrates a disc 20 adapted to form a rotor assembly when mounted to an engine shaft of a gas turbine engine such as shown in FIG. 1. The disc 20 is to be mounted perpendicularly to a longitudinal axis of the engine shaft such that a rotation of the engine shaft drives the disc 20. The disc 20 comprises two opposed circular faces 22 and a blade receiving edge 24 which extends circumferentially between the two opposed faces 22. The edge 24 is adapted to receive blades (not shown) projecting radially therefrom. A circular flange 26 is concentrically mounted to the disc 20. The flange 26 projects parallel to the axis of the engine shaft from one face 22 of the disc 20.

The flange 26 has an inward face 28 and an outward face 30 separated by a circumferential edge 32. The circumferential edge 32 is provided with a plurality of scallop recesses 34 located about the circumference of the flange 26. Each scallop recess 34 extends through the thickness of the flange 26 from the inward face 28 to the outward face 30. The scallop recesses 34 reduce or substantially eliminate the hoop stress while reducing the overall rotor assembly weight.

At least one balancing weight clip 36 is removably secured to the flange 26. The mass and the circumferential position about the flange of the balancing weight clip 36 are chosen so that the rotor assembly is balanced when the balancing weight clip 36 is removably secured to the flange 26 at said position. As illustrated in FIG. 2, the balancing weight clip 36 is positioned on the flange 26 between two adjacent recesses 34.

Figure 3A:
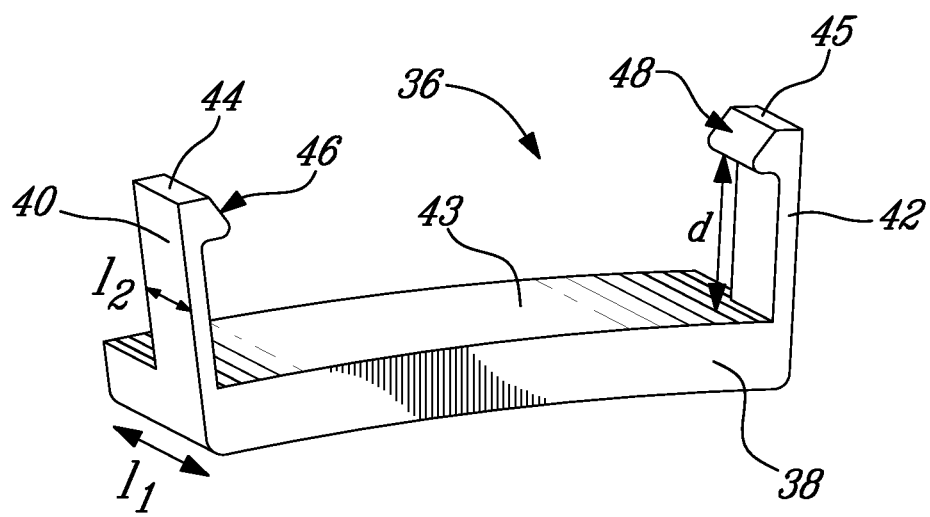
FIGS. 3a is a perspective view of a balancing weight clip engageable between two following recesses, in accordance with an embodiment.
Figure 3B:
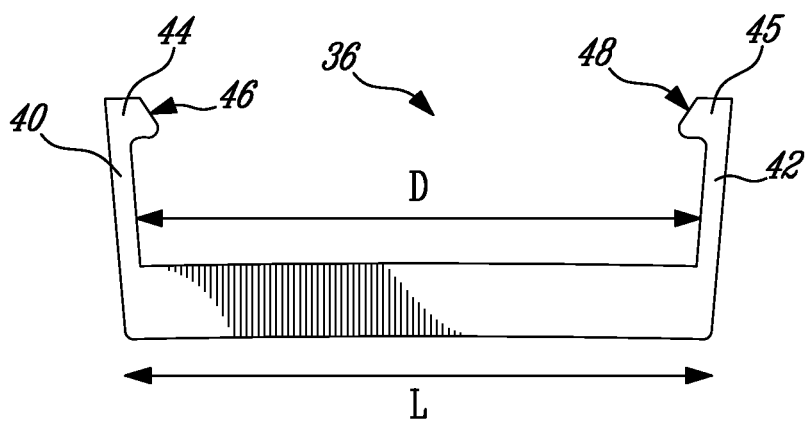
Figure 3C:
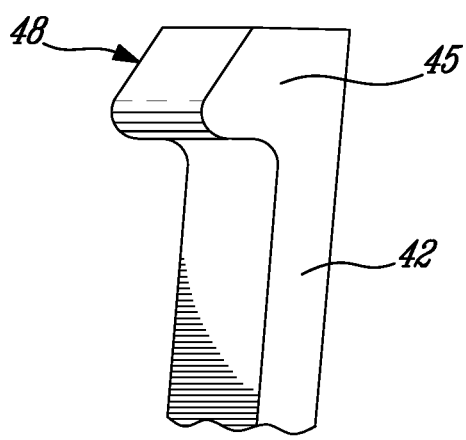
FIGS. 3c is a perspective view of a hook of the balancing weight clip of FIGS. 3a and 3b.

As seen in Figs. FIGS. 3a and 3b, an embodiment of the balancing weight clip 36 is shown in an unsecured or detached position, i.e. when the balancing weight clip 36 is not secured to the flange 26. The balancing weight clip 36 is substantially U-shaped and comprises a weight portion 38, a first flange engaging portion 40, and a second flange engaging portion 42. The first and second flange engaging portions 40 and 42 project substantially perpendicularly from the weight portion 38 at opposite ends of the weight portion 38. The space between the first and second flange engaging portions 40 and 42 define a flange receiving opening. The first and second flange engaging portions 40 and 42 are each provided with a hook 44. 45, respectively in the flange receiving opening. The hooks 44 and 45 are located at a distal end of their respective flange engaging portion 40, 42 and they are inwardly oriented to face each other. Each hook 44, 45 is provided with an inclined insertion face 46, 48, respectively, as illustrated in FIG. 3c.

In this embodiment, the weight portion 38 is curved along its length L and its curvature substantially corresponds to that of the flange 26. As best illustrated in FIG. 3a, the width $l_1$ of the weight portion 38 is longer than the width $l_2$ of the first and second flange engaging portions 40 and 42. The distance D which separates the first and second flange engaging portion 40 and 42 is substantially equal to the distance between two adjacent recesses 34 of the flange 26 so that the face 43 of the weight portion 38 located between the fist and second flange engaging portions 40 and 42 forms a flange engaging face. The height d between the hook 44, 45 and the weight portion 38 is substantially equal to the thickness of the flange 26. At least one of the first and second flange engaging portions 40 and 42 is elastically deformable to allow the engagement and disengagement of the balancing weight clip 36 to the flange 26. Accordingly, the first and second flange engaging portions 40 and 42 are not plastically deformed upon installation of the balancing weight clip 36 on the flange 26. Any suitable material may be used to form the elastically deformable and/or deflectable flange engaging portions 40, 42, providing the yield point of the material is not reached during installation and removal of the clip, and providing that the selected material will survive the gas turbine engine environment.

Figure 4A:
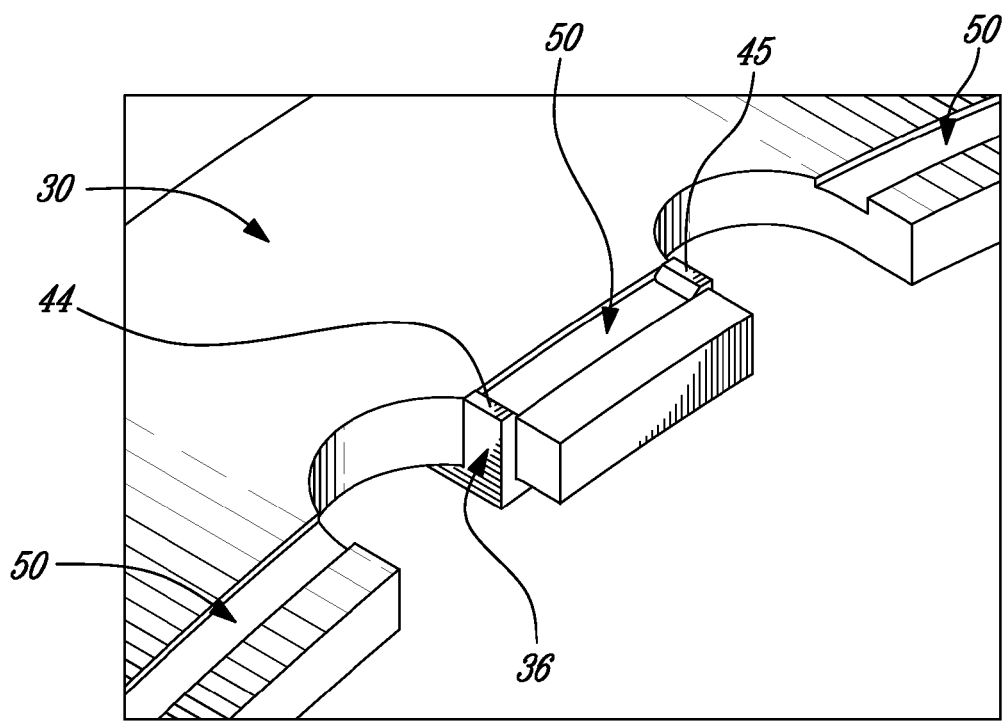
FIG. 4a is a partial perspective top view of the scalloped flange of FIG. 2 to which the balancing weight clip of FIGS. 3a and 3b is secured.
Figure 4B:
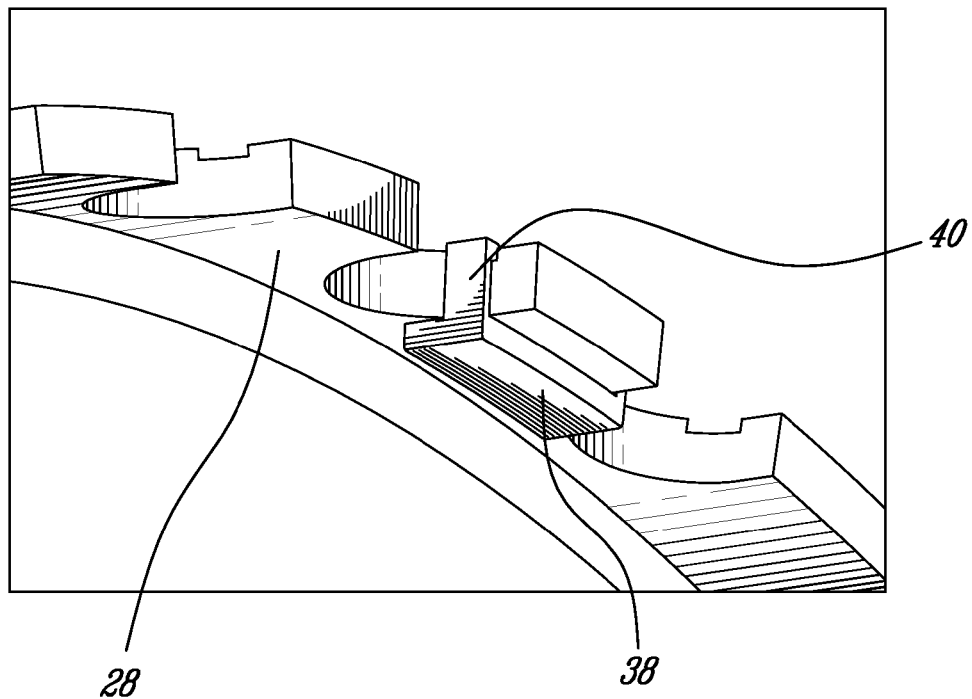
FIG. 4b is a partial perspective bottom view of the scalloped flange of FIG. 2 to which the balancing weight clip of FIGS. 3a and 3b is secured.

FIGS. 4a and 4b illustrate the flange 26 to which the balancing weight clip 36 is removably attached. The flange 26 is provided with a plurality of individual groove segments 50 on its outward face 30, which together form a discontinuous circumferential groove. As it is interrupted by the scallop recesses 34, the circumferential groove formed by the groove segments 50 is said to discontinuously extend about the circumference of the flange 26. Each groove segment 50 extends between two adjacent scallop recesses 34 substantially parallel to the circumferential edge 32 of the flange 26. The width of the groove 50 is substantially equal to the width $l_2$ of the hook 44, 45 so that the hook 44, 45 is engageable with the groove 50. The distance between two following recesses 34 is substantially equal to the distance D between the first and second flange engaging portions 40 and 42 of the balancing weight clip 36.

When the balancing weight clip 36 is in an engaged position, i.e. when the balancing weight clip 36 is removably secured to the flange 26, the balancing weight clip 36 conforms to the shape of the portion of the flange 26 located between two following recesses 34 to which the balancing weight clip 36 is secured. As a result, the first flange engaging portion 40, the second flange engaging portion 42, the weight portion, and the hooks 44 and 45 respectively engage a sidewall of one of the two recesses 34, the other one of the two recesses 34, the inward face of the portion of the flange 26 located between the two recesses and the groove 50. As the distance D between the first and second flange engaging portions 40 and 42 of the balancing weight clip 36 is substantially equal to the circumferential length of the portion of the flange 26 located between two following recesses 34, the balancing weight clip 36 is prevented from any circumferential displacement. As the height d between each hook 44, 45 and the weight portion 38 is substantially equal to the thickness of the grooved flange and as the distance between the hooks 44 and 45 is shorter than the distance between the two following recesses 34, the balancing weight clip 36 is prevented from any radial displacement. As the width of the recess 50 is substantially equal to the width $l_2$ of the hook 44, 45, the hook 44, 45 abuts against the sidewalls of the groove 50. This prevents any displacement of the balancing weight clip 36 along the longitudinal rotational axis of the disc 20. As a result, the balancing weight clip 36 is fixedly maintained in position during a rotation of the disc 20 while being removable from the flange 26 without requiring any additional fastening means such as screws, bolts, adhesive, and the like.

The circumferential position, i.e. the particular scallop recesses 34 between which the balancing weight clip is to be secured, and the weight of the balancing weight clip are chosen to balance the disc 20 and/or the rotor assembly comprising the disc 20.

In one embodiment, the disc 20 is part of a rotor assembly present in the multistage compressor 14 such as shown in FIG. 1. Alternatively, the disc can be part of a rotor assembly present in the turbine section 18 illustrated in FIG. 1. It should be understood that a number of balancing weight clips 36 can be secured to the flange 26 at predetermined circumferential positions as required to balance the disc 20.

Figure 5:
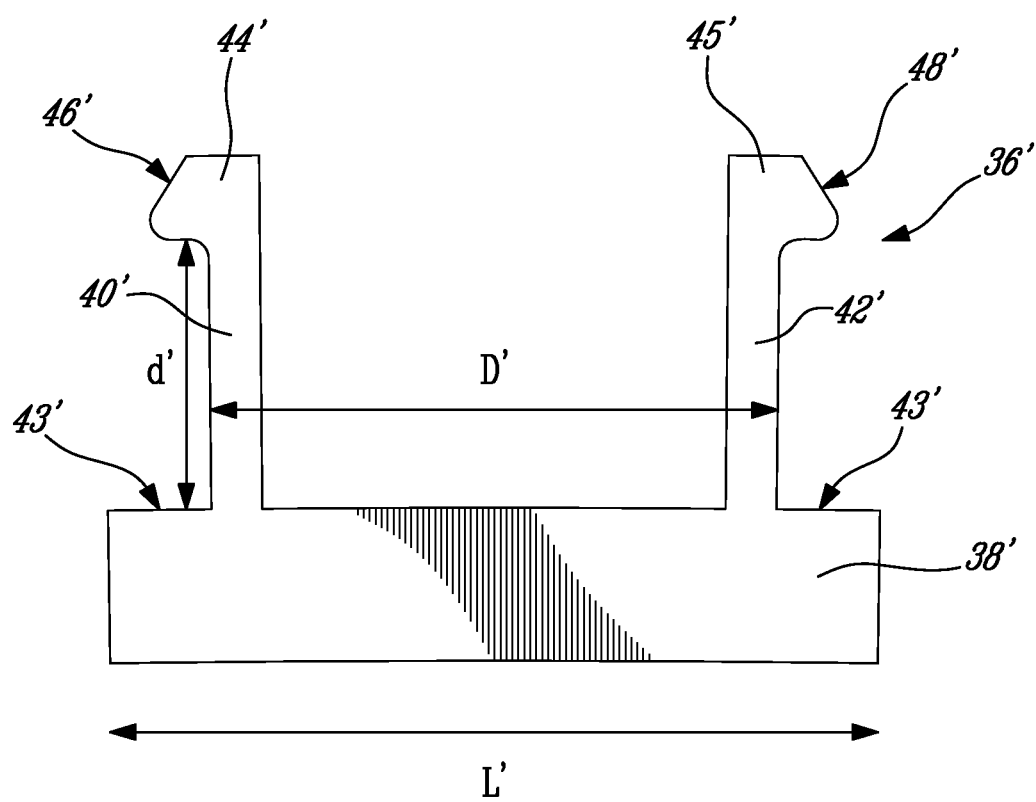
FIG. 5 is a front view of a balancing weight clipin accordance with an alternate embodiment, the balancing weight clip being engageable with a single recess.

FIG. 5 illustrates an alternate balancing weight clip 36' that is removably attachable to a single recess 34. The balancing weight clip 36' comprises a weight portion 38', and a first and second flange engaging portion 40' and 42', respectively. At least one of the first and second flange engaging portions 40' and 42' is elastically deformable such that the balancing weight clip 36 is removably attachable to the flange 26. The weight portion 38' has a curvature adapted to that of the flange 26. The first and second flange engaging portions 40' and 42' project substantially perpendicularly from the weight portion 38' such that the distance D' illustrated in FIG. 5 is substantially equal to the circumferential length of the recess 34. The distance D' is the distance between the first and second flange engaging portions 40' and 42' including the thickness of the first and second flange engaging portions 40' and 42'. Each flange engaging portion 40', 42' is provided with a hook 44', 45' having an insertion face 46', 48'. The hooks 44' and 45' are outwardly oriented to project in opposite directions. The length L' of the weight portion 38' is longer than the distance D' and than the circumferential length of the recess 34 such that flange engaging sections 43' of the weight portions 38' are engageable with the inward face 28 of the flange 26. The distance between the hook 44', 45' and the weight portion 38' is substantially equal to the thickness of the grooved section of the flange 26. Because at least one of the first and second flange engaging portions 40' and 42' is elastically deformable, the balancing weight clip 36' can be removably secured to the flange 26.

Figure 6A:
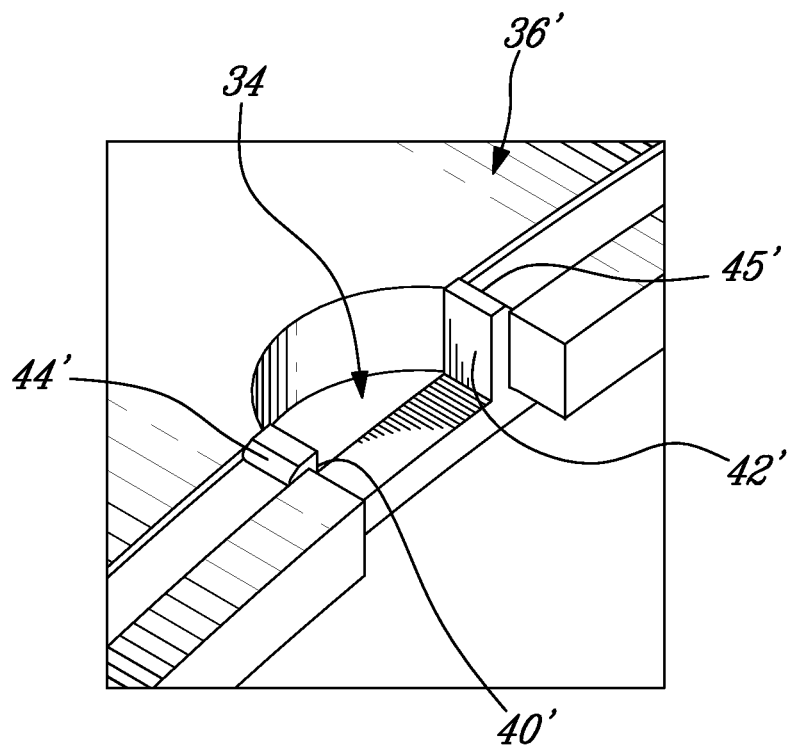
FIG. 6a is a partial perspective top view of the scalloped flange of FIG. 2 to which the balancing weight clip of FIG. 5 is secured.
Figure 6B:
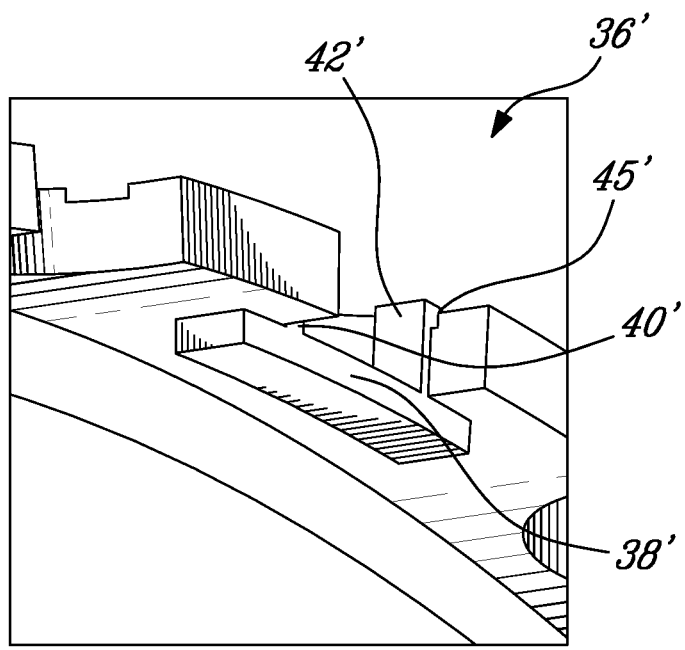
FIG. 6b is a partial perspective bottom view of the scalloped flange of FIG. 2 to which the balancing weight clip of FIG. 5 is secured.

FIGS. 6a and 6b illustrate the balancing weight clip 36' in the engaged position, i.e. when the balancing weight clip 36' is removably secured to the flange 26. In this position, the weight portion 38' of the balancing weight clip 36 bridges a single particular recess 34 within which the balancing weight clip 36' is secured. As a result, the first flange engaging portion 40' and the second flange engaging portion 42' engage the sidewalls of the one particular recess 34 while the flange engaging sections 43' and the hooks 44' and 45' respectively engage the inward faces of the flange 26 located on each side of the recess 34 and the groove 50. As the distance D' between the first and second flange engaging portions 40' and 42' of the balancing weight clip 36' is substantially equal to the circumferential length of the recess 34, the balancing weight clip 36' is prevented from any circumferential displacement. As the height d' between each hook 44', 45' and the flange engaging section 43' of the weight portion 38' is substantially equal to the thickness of the grooved flange and as the distance between the hooks 44' and 45' is larger than the circumferential length of the recess 34, the balancing weight clip 36' is prevented from any radial displacement. As the width of the recess 50 is substantially equal to the width of the hook 44', 45', the hook 44', 45' abuts against the sidewalls of the groove 50. This prevents any displacement of the balancing weight clip 36' along the longitudinal rotational axis of the disc 20. As a result, the balancing weight clip 36' is fixedly maintained in position during a rotation of the disc 20 while being removable from the flange 26.

The circumferential position, i.e. the particular scallop recess 34 to which the balancing weight clip 36' is to be secured, and the weight of the balancing weight clip 36' are chosen to balance the disc 20 and/or the rotor assembly comprising the disc 20.

It should be noted that the shape and size of the scallop recess 34 may vary. For example, the recess 34 may be square or rectangular. While the grooves 50 are provided on the outward face 30 of the flange 26, it should be understood that the grooves 50 may be located on the inward face 28 of the flange 26. In this case, the weight portion 38 of the balancing weight clip 36 or the flange engaging sections of the balancing weight clip 36' engage the outward face of the flange 26 when the balancing weight portion 36, 36' is in the secured position. While each groove 50 continuously extend between two following recesses 34, it should be understood that each groove 50 may be replaced by two discrete grooves each being adjacent to a corresponding one of the two following recesses 34. The discrete grooves form a groove which discontinuously extends on the outward face 30 of the flange 26.

While the flange 26 of the disc 20 is provided with a circumferential groove 50, it should be understood that a pair of rails circumferentially extending on the outward face 30 of the flange 26 may be used for preventing any displacement of the balancing weight clip 36, 36' along the direction of the rotational axis of the disc 20. In this case, the rails are longitudinally spaced apart by a distance substantially equal to the width of the hook 44, 45, 44', 45'. The opening between the pair of rails constitutes a groove circumferentially extending on the outward face 30 of the flange 26 and adapted to receive the hook 44, 45, 44', 45'.

It should be understood that the shape and the dimensions of the balancing weight clip 36, 36' may vary as long as at least one of the first and second flange engaging portions 40, 40' and 42, 42' is elastically deformable to allow the attachment of the balancing weight clip 36, 36' to the flange 26. For example, while the balancing weight clip 36 illustrated in FIGS. 3a and 3b comprises a weight portion larger than the flange engaging portions 40 and 42, the weight portion 38 and the first and second flange engaging portions 40 and 42 may have the same width $l_2$. In another example, while the weight portions 38 and 38' are curved to follow the curvature of the flange 26, the weight portions 38 and 38' may be straight. In this case, the height d and d' of the flange engaging portions 40, 42, and 40', 42' may be longer than the thickness of the flange 26 depending on the length L, L' of the balancing weight clip 36, 36'.

The balancing weight clip 36, 36' may be made of any adequate material or combination of materials which allows at least one the flange engaging portions 40, 40' and 42, 42' to be elastically deformable during the attachment of the balancing weight clip 36, 36' to the flange 26 and to substantially recover its initial shape once disengaged from the flange 26.

It should also be understood that the dimensions of the weight portion 38, 38', the first flange engaging portion 40, 40', and/or the second flange engaging portion 42, 42' can be varied in order to vary the weight of the balancing weight clip 36, 36'. Alternatively, the material of the balancing weight clip 36, 36' may be varied to vary the weight of the balancing weight clip 36, 36'.

It should be understood that the hook 44, 45, 44', 45' may have any adequate shape which allows the balancing weight clip 36, 36' to be held in position in the radial direction. For example, the hook 44, 45, 44', 45' may be square or half-circular.

In one embodiment, the flange engaging portions 40, 42, 40'. 42' are bent. In the case of the balancing weight clip 36, the first and second flange engaging portions 40 and 42 can be inwardly inclined such that the distance D between the first and second flange engaging portions 40 and 42 distal to the weight portion 38 is shorter than the distance D proximal to the weight portion 38. In the case of the balancing weight clip 36', the first and second flange engaging portions 40' and 42' can be outwardly inclined such that the distance D' between the first and second flange engaging portions 40' and 42' distal to the weight portion 38' is longer than the distance D' proximal to the weight portion 38'.

In one embodiment, the rotor disk 20, 20' is a powder metal rotor.

The disc 20 or 20' may also be provided with several flanges 26, 26' located at different positions along the radius fo the disc 20, 20' in order to be able to vary the radial position of the balancing weight clip 36, 36'.

Figure 7:
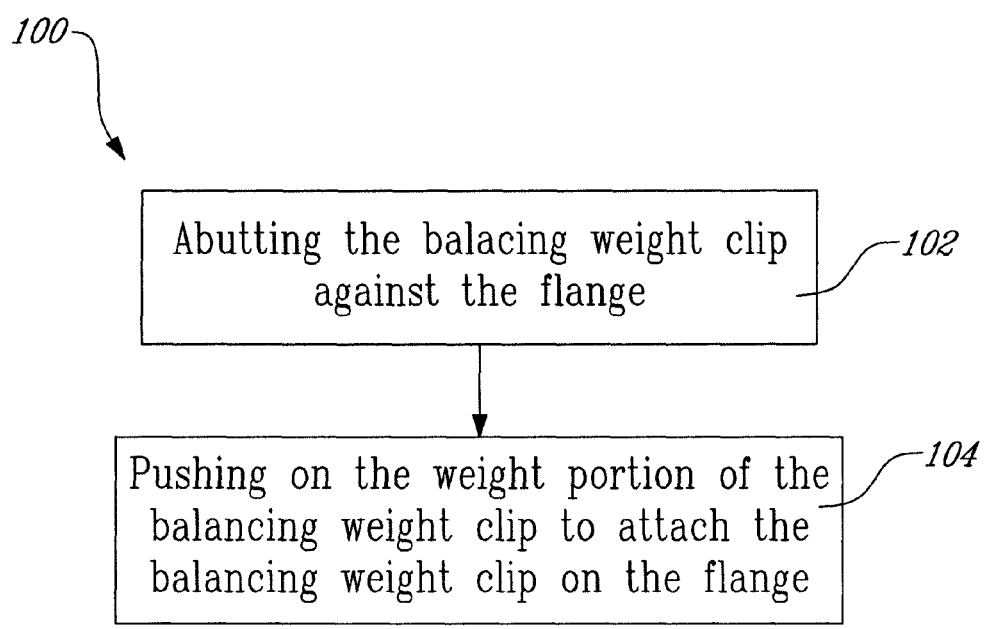
FIG. 7 is a flow chart of a method for balancing a rotor assembly.

FIG. 7 illustrates one method 100 for removably securing the balancing weight clip 36. 36' to the flange 26. The first step 102 of the method 100 is the abutment of the hooks 44, 44', and 45, 45' of the first and second flange engaging portions 40, 40' and 42, 42' against the sidewalls of a recess 34. The last step 104 consists in exerting a force on the balancing weight clip 36, 36' towards the flange 26 such that the first and second flange engaging portions 40, 40', and 42, 42' engages the sidewalls of the recess 34. Since at least one of the first and second flange engaging portions 40, 40' and 42, 42' is elastically deformable, the hooks 44, 44' and 45, 45' engage the groove 50 and the balancing weight clip 36, 36' is fixedly maintained in position on the flange 26 while being removable.

In one embodiment, the step 102 comprises exerting a force on the elastically deformable flange engaging portion(s) 40, 40', 42, 42'. In the case of the balancing weight portion 36, the force is outwardly exerted on the flange engaging portion(s) 40 and/or 42. Since at least one of the flange engaging portions 40 and 42 is elastically deformable, the hooks 44 and 45 are spaced apart by a distance larger than the distance between two following recesses 34 such that the hook 44 can abut against the sidewall of a first recess 34 and the second hook 45 can abut against the sidewall of the following recess 34. In the case of the balancing weight portion 36', the force is inwardly exerted on the flange engaging portion(s) 40' and/or 42'. Since at least one of the flange engaging portions 40' and 42' is elastically deformable, the hooks 44' and 45' are moved closer to a distance shorter than the circumferential length of a recess 34 such that the hooks 44 and 45 can abut against opposite sidewalls of a same recess 34.

In another embodiment, the step 102 comprises abutting the insertion faces 46, 46' and 48, 48' against the intersection corner between the inward face 28 of the flange 26 and the sidewalls of the recess 34. In the case of the balancing weight portion 36, the insertion face 46 of the hook 44 is abutted against the corner between the inward face 28 of the flange 26 and the sidewall of a recess 34 while the insertion face 48 of the hook 45 is abutted against the corner between the inward face 28 of the flange 26 and the sidewall of a next recess 34. In the case of the balancing weight 36', the insertion face 46' of the hook 44' is abutted against the corner between the inward face 28 of the flange 26 and a first sidewall of a recess 34 while the insertion face 48' of the hook 45' is abutted against the corner between the inward face 28 of the flange 26 and a second sidewall of the recess 34 opposite to the first sidewall.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure, and such modifications are intended to fall within the appended claims.

The invention claimed is:

1. A rotor assembly for a gas turbine engine, comprising:
a disc adapted for mounting to an engine shaft defining a longitudinal axis, the disc having two opposed faces and a circumferential blade receiving edge therebetween adapted for mounting of a plurality of radially projecting blades, an axially extending flange integrally formed with the disc and projecting from one of the two opposed faces of the disc and annularly extending therearound at a radial location that is spaced apart from the circumferential blade receiving edge of the disc, an edge of the flange having at least one recess, the flange having a circumferential groove discontinuously extending about a circumference thereof; and
at least one unitary balancing weight clip engaged solely to the axially extending flange and comprising a first flange engaging portion and a second flange engaging portion circumferentially spaced apart by a weight portion therebetween, the weight portion and the first and second flange engaging portions being integrally formed, the first and second flange engaging portions each being provided with a hook mating with the circumferential groove and the weight portion, the balancing weight clip being removably secured to the flange in a secured position wherein the hooks each engage the circumferential groove, the at least one balancing weight clip being immobile in an axial and circumferential direction when in the secured position, at least one of the first and second flange engaging portions being resiliently biased so that the first and second flange engaging portions are elastically moveable away from one another to receive the flange in a flange receiving opening defined by the first flange engaging portion, the second flange engaging portion and the weight portion.

2. The rotor assembly as claimed in claim 1, wherein the at least one recess comprises a plurality of recesses circumferentially positioned about the flange, the hooks are inwardly positioned to face each other, and the first and second flange engaging portions are adapted to engage with a sidewall of a first one of the plurality of recesses and a sidewall of a second one of the at least one recess, respectively, a distance between the first and second flange engaging portions being substantially equal to a portion of the flange extending between the first one and the second one of the at least one recess.

3. The rotor assembly as claimed in claim 1, wherein the hooks are outwardly positioned to project in opposite directions, and the first and second flange engaging portions are adapted to engage with opposite sidewalls of the at least one recess, a length of the weight portion being longer than a distance between the first and second flange engaging portions including a thickness thereof.

4. The rotor assembly as claimed in claim 1, wherein the hooks each comprise an inclined insertion face.

5. The rotor assembly as claimed in claim 1, wherein the first and second flange engaging portions are curved along a length thereof, a curvature of the first and second flange engaging portions being substantially equal to a curvature of the flange.

6. The rotor assembly as claimed in claim 1, wherein a distance between the first and second flange engaging portions is constant along a width of the first and second flange engaging portions.

7. The rotor assembly as claimed in claim 2, wherein a distance between the first and second flange engaging portions distal to the weight portion is inferior to a distance between the first and second flange engaging portions proximal to the weight portion.

8. The rotor assembly as claimed in claim 3, wherein a distance between the first and second flange engaging portions distal to the weight portion is superior to a distance between the first and second flange engaging portions proximal to the weight portion.

9. A balancing weight clip for a rotor assembly of a gas turbine engine, comprising:
a unitary weight portion defining a mass adapted to balance the rotor assembly, the weight portion being disposed between circumferentially spaced apart first and second flange engaging portions, the first and second flange engaging portions being integrally formed with the weight portion; and the first flange engaging portion and the second flange engaging portion each being engageable with a sidewall of at least one recess located on an edge of a flange of a disc of the rotor assembly, and each being provided with a hook engageable with a mating groove provided on a face of the flange, at least one of the first and second flange engaging portions being elastically deformable so that the first and second flange engaging portions are elastically moveable away from one another to removably secure the balancing weight clip to the flange and engage each said hook with the mating groove.

10. The balancing weight clip as claimed in claim 9, wherein the hooks are inwardly positioned to face each other, and the first and second flange engaging portions are adapted to engage with a sidewall of a first one of the at least one recess and a sidewall of a second one of the at least one recess, respectively, a distance between the first and second flange engaging portions being substantially equal to a portion of the flange extending between the first one and the second one of the at least one recess.

11. The balancing weight clip as claimed in claim 9, wherein the hooks are outwardly positioned to project in opposite directions, and the first and second flange engaging portions are adapted to engage with opposite sidewalls of the at least one recess, a length of the weight portion being greater than an outermost distance between the first and second flange engaging portions.

12. The balancing weight clip as claimed in claim 9, wherein a width of the weight portion is larger than a width of the first and second flange engaging portions.

13. The balancing weight clip as claimed in claim 9, wherein the hooks each comprise an inclined insertion face.

14. The balancing weight clip as claimed in any claim 9, wherein the first and second flange engaging portions are curved along a length thereof, a curvature of the first and second flange engaging portions being substantially equal to a curvature of the flange.

15. The balancing weight clip as claim in claim 9, wherein a distance between the first and second flange engaging portions is constant along a width of the first and second flange engaging portions.

16. The balancing weight clip as claimed in claim 10, wherein a distance between the first and second flange engaging portions distal to the weight portion is inferior to a distance between the first and second flange engaging portions proximal to the weight portion.

17. The balancing weight clip as claimed in claim 11, wherein a distance between the first and second flange engaging portions distal to the weight portion is superior to a distance between the first and second flange engaging portions proximal to the weight portion.

18. A method for balancing a rotor disc having two opposed faces and an axially extending flange projecting from one of the two opposed faces of the disc and annularly extending therearound at a radial location that is spaced apart from a circumferential blade receiving edge of the disc disposed between the two opposed faces of the disc and adapted for mounting a plurality of radially projecting blades, an edge of the flange having at least one recess, the flange having a groove discontinuously extending about a circumference thereof, the method comprising:

abutting a balancing weight clip against the flange of the rotor disc, the balancing weight clip having a mass adapted to balance the rotor disc, the balancing weight clip having a first flange engaging portion and a second flange engaging portion circumferentially spaced apart from each other by a weight portion extending therebetween, the first and second flange engaging portions being integrally formed with the weight portion, each of the first and second flange engaging portions extending substantially radially and being engageable with a sidewall of at least one recess, and each being provided with a hook engageable with the groove of the flange, at least one of the first and second flange engaging portions being elastically deformable so that the first and second flange engaging portions are elastically moveable away from one another to removably secure the balancing weight clip to the flange and engage each hook with the mating groove, the abutting the balancing weight clip comprising abutting each hook against a sidewall of the at least one recess of the flange; and radially engaging the balancing weight clip solely to the axially extending flange of the disc by exerting a substantially radial force on the weight portion towards the flange in order to engage the hooks with the groove and removably secure the balancing weight clip to the flange, the exerting the force resulting in elastically moving the first and second flange engaging portions away from one another in a substantially circumferential direction.

19. The method as claimed in claim 18, wherein the abutting each hook comprises abutting the hooks against opposite sidewalls of the at least one recess.

20. The method as claimed in claim 18, wherein the abutting each hook comprises abutting the hooks against a sidewall of a first one of the at least one recess and a sidewall of a second one of the at least one recess.

* * * * *